United States Patent [19]

Margison

[11] Patent Number: 4,558,805
[45] Date of Patent: Dec. 17, 1985

[54] FLUENT SOLID MATERIAL HANDLING SYSTEM

[75] Inventor: Elwood R. Margison, Downers Grove, Ill.

[73] Assignee: United Conveyor Corporation, Deerfield, Ill.

[21] Appl. No.: 485,222

[22] Filed: Apr. 13, 1983

[51] Int. Cl.⁴ .............................................. B65G 3/04
[52] U.S. Cl. ................................... 222/133; 110/259; 222/59; 222/145; 222/190; 222/482; 414/291
[58] Field of Search ................. 73/861.73; 141/70, 94, 141/192, 248; 222/55, 56, 331, 133, 52, 59, 145, 190, 482; 406/48; 110/259; 137/486, 497; 414/133, 291

[56] References Cited

U.S. PATENT DOCUMENTS

| | | | |
|---|---|---|---|
| 2,648,572 | 8/1953 | Thorsten | 406/60 |
| 2,889,030 | 6/1959 | Mottet | 222/55 X |
| 3,198,386 | 8/1965 | Hartley | 222/56 X |
| 3,223,283 | 12/1965 | Goodwin | 222/56 |
| 3,404,963 | 10/1968 | Fritsche et al. | 222/56 X |
| 3,505,790 | 4/1970 | Rothemich | 222/56 X |
| 3,511,267 | 5/1970 | Stonich | 137/486 |
| 3,557,616 | 1/1971 | Landon, Jr. et al. | 73/861.73 |
| 3,631,824 | 1/1972 | Smuck | 110/259 X |
| 3,653,639 | 4/1972 | Mueller | 366/106 |
| 3,809,436 | 5/1974 | Ciaffone | 406/48 |
| 4,200,412 | 4/1980 | Steele | 406/22 |
| 4,354,622 | 10/1982 | Wood | 73/861.73 X |
| 4,390,281 | 6/1983 | Scriminger | 406/48 X |

FOREIGN PATENT DOCUMENTS 1408394 10/1975 United Kingdom ................ 137/486

Primary Examiner—Stephen Marcus
Assistant Examiner—Mark Thronson
Attorney, Agent, or Firm—Wood, Dalton, Phillips, Mason & Rowe

[57] ABSTRACT

A system for handling fluent solid material includes a material collecting hopper having a bottom provided with several discharge openings, ducts for delivering material from all the discharge openings into a transfer hopper that has one or more bottom outlets. An upright feed conduit with a feed valve is connected to each bottom outlet. If there are two or more bottom outlets at least one may connect to a bypass conduit with a bypass feed valve. A moistening chamber receives liquid at a controlled rate, and material from a feed conduit goes directly into the moistening chamber while material from a bypass conduit does not. Each conduit is provided with a material flow transducer that controls the position of the feed valve in response to the sensed volume of material flowing through the conduit so as to closely control the rate at which material flows from the conduit. Each feed valve or bypass feed valve may be closed so as to load a transport vehicle either with dry material or with moistened material.

2 Claims, 5 Drawing Figures

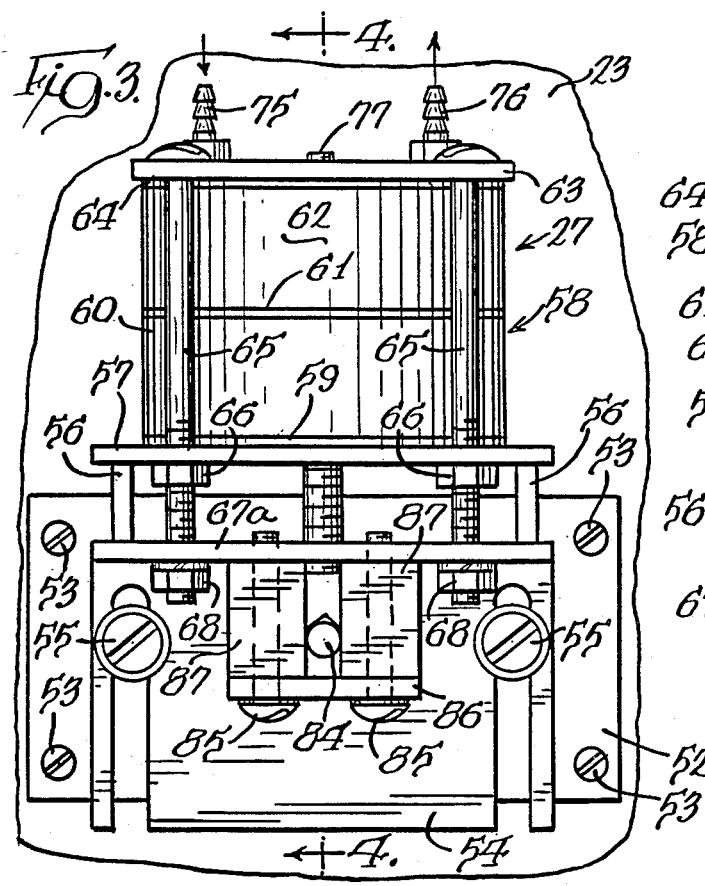
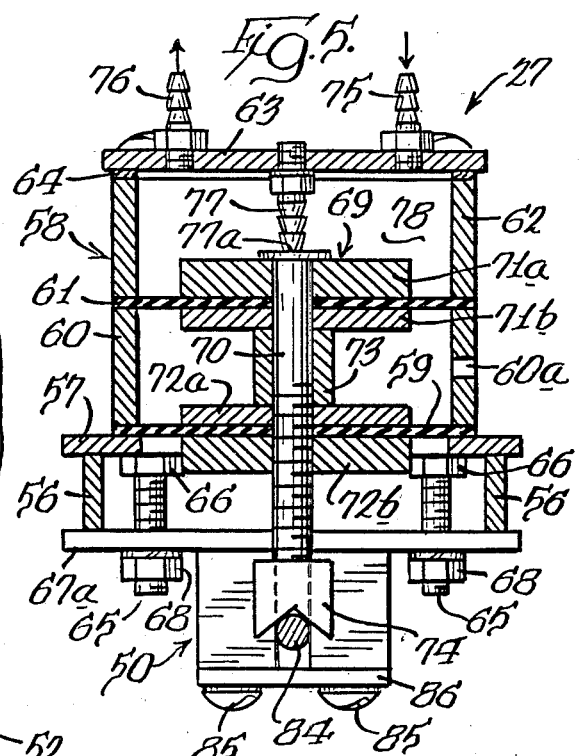
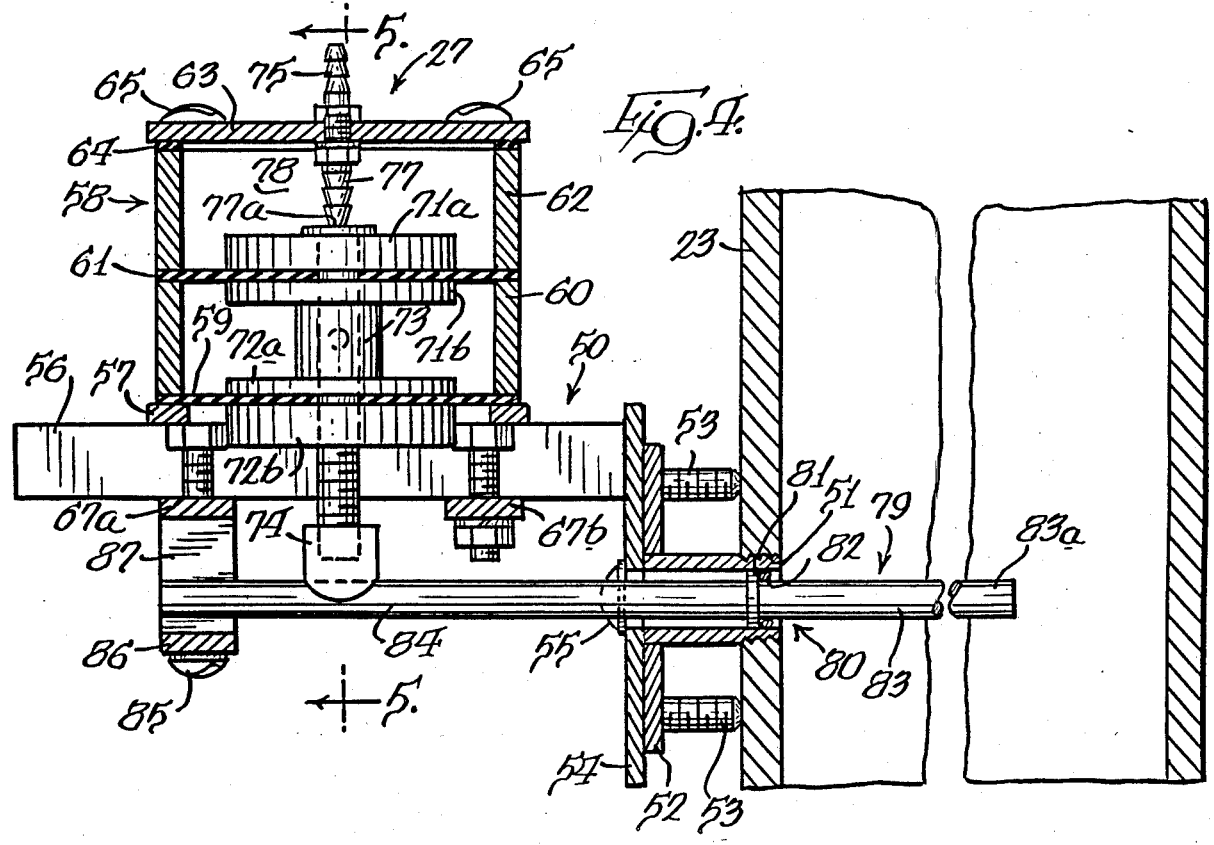

4,558,805

FLUENT SOLID MATERIAL HANDLING SYSTEM

CROSS REFERENCE TO RELATED APPLICATION

The flow transducer, a prototype of which is described in detail in the present application, is described in greater detail, including a production embodiment, and claimed in applicant's copending U.S. patent application Ser. No. 485,223, filed Apr. 13, 1983, titled Fluent Solid Material Flow Transducer, issued Nov. 13, 1984 as U.S. Pat. No. 4,481,831.

BACKGROUND OF THE INVENTION

"Fluent solid material" is used herein as a generic term to include pulverulent or granular material which is capable of flowing freely, either in an unassisted gravity system or in aerated or liquid slurry form.

Systems for handling fluent solid material must include means for moving the pulverulent material from one or more collecting hoppers into a transport device. Depending upon the nature of the material, it may be transported for use in its raw state, or for further processing, or for mixing with another material as filler, or for disposal as waste. The use to which the material gathered in the collecting hoppers is to be put determines the state in which it should be delivered to a transport device.

One very desirable way of handling fine, pulverulent material, such as the large quantities of fly ash produced by a high capacity coal-burning steam boiler, is to mix it with a predetermined quantity of liquid, usually water, to eliminate the enormous dust problem which accompanies the handling of such material. On the other hand, there may be some circumstances in which the collected pulverulent material must be transported in the dry state.

Patents known to applicant and his attorney which are most pertinent to the present system include U.S. Pat. Nos. 2,648,572; 3,653,639; 3,809,436; and 4,200,412.

SUMMARY OF THE INVENTION

In accordance with the present invention, a system for handling fluent solid material includes a transfer hopper, a plurality of ducts for delivering material to the transfer hopper, and an upright feed conduit the upper end of which communicates with the bottom of the transfer hopper to receive material from the hopper for substantially vertical gravity flow. The system particularly includes the combination of a feed valve to control movement of material into the upper end of the feed conduit, a material flow transducer which includes a sensor in the feed conduit to continuously sense the volume of material flowing through the conduit, and means operatively associated with the transducer and with the feed valve to control the position of the valve in response to the sensed volume of material flowing through the feed conduit so as to closely control the rate at which material flows from the conduit.

Such a system may be used to control the rate at which dry material flows from the conduit into a material transport device; or it may be used to control the rate at which material flows into a moistening chamber to be mixed with liquid which is fed into the moistening chamber at a controlled rate, so that material flowing from the moistening chamber has a closely controlled percentage of moisture.

In a preferred system, the transfer hopper has two feed conduits connected to its lower end, each equipped with a feed valve and a material flow transducer. One conduit feeds material into a moistening chamber, while the other conduit serves as a feed bypass to deliver material directly into a transport device. Means are provided for selectively closing the feed valve in one or the other of the two conduits.

THE DRAWINGS

FIG. 3 is an elevational view of a prototype flow transducer;

FIG. 4 is a fragmentary sectional view taken substantially as indicated along the line 4—4 of FIG. 3; and FIG. 5 is a sectional view taken substantially as indicated along the line 5—5 of FIG. 4.

DETAILED DESCRIPTION OF THE INVENTION

Figure 1:
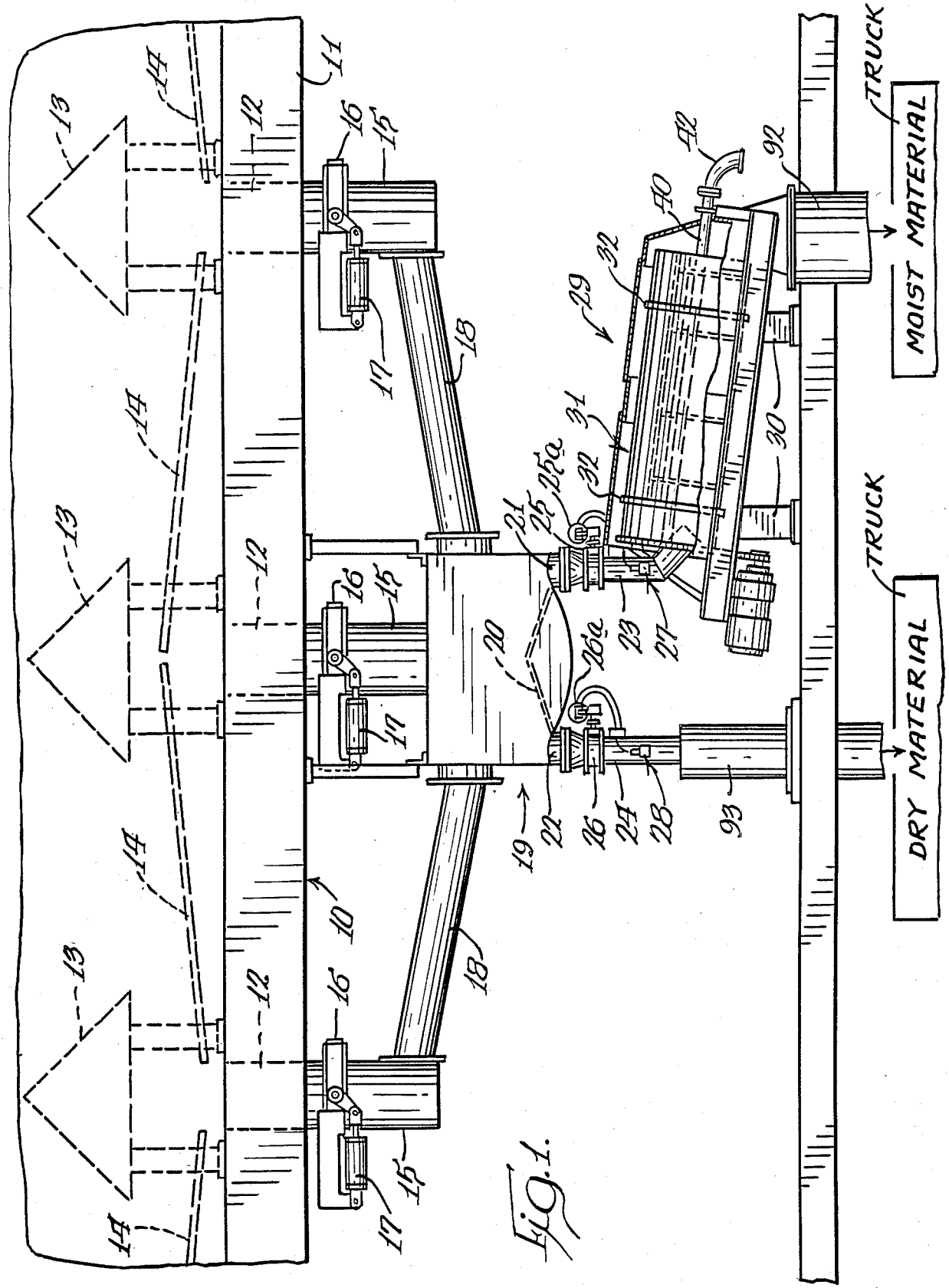
FIG. 1 is a fragmentary side elevational view of a system embodying the invention.

Referring to the drawings in detail, and referring first to FIG. 1, a preferred embodiment of the invention used for dry pulverulent material such as fly ash includes a material collecting hopper, indicated generally at 10, which has a heavy floor 11 provided with several discharge openings 12. Above each discharge opening is a conical baffle 13, and aerating conveyors 14, which are preferably inclined, assist in moving dry, pulverulent material such as fly ash into discharge ducts 15, each of which is provided with a control valve arrangement 16 that is operated by an air cylinder 17 to close and open the valves 16 for selectively admitting material to the ducts 15. At the lower end of each of the ducts 15 is a transfer duct 18 which communicates with the interior of a transfer hopper, indicated generally at 19. The bottom of the illustrated transfer hopper is provided with two oppositely inclined material aerating floors 20 which lead to a first bottom outlet 21 and a second bottom outlet 22. However, in various systems a hopper with a single central bottom outlet may be used with a suitably arranged aerating floor; or there may be more than two outlets and an appropriate aerating floor or floors.

Connected to the first bottom outlet 21 is a feed conduit 23; and connected to the second bottom outlet 22 is a feed bypass conduit 24. A feed valve 25 operated by a power unit 25a controls flow of material into the feed conduit 23, and a feed bypass valve 26 operated by a power unit 26a controls movement of material into the bypass conduit 24.

A fluent solid material flow transducer, indicated generally at 27, controls the position of the feed valve 25 as will be described in detail hereinafter; and an identical material flow transducer, indicated generally at 28, controls the position of the bypass feed valve 26.

Figure 2:
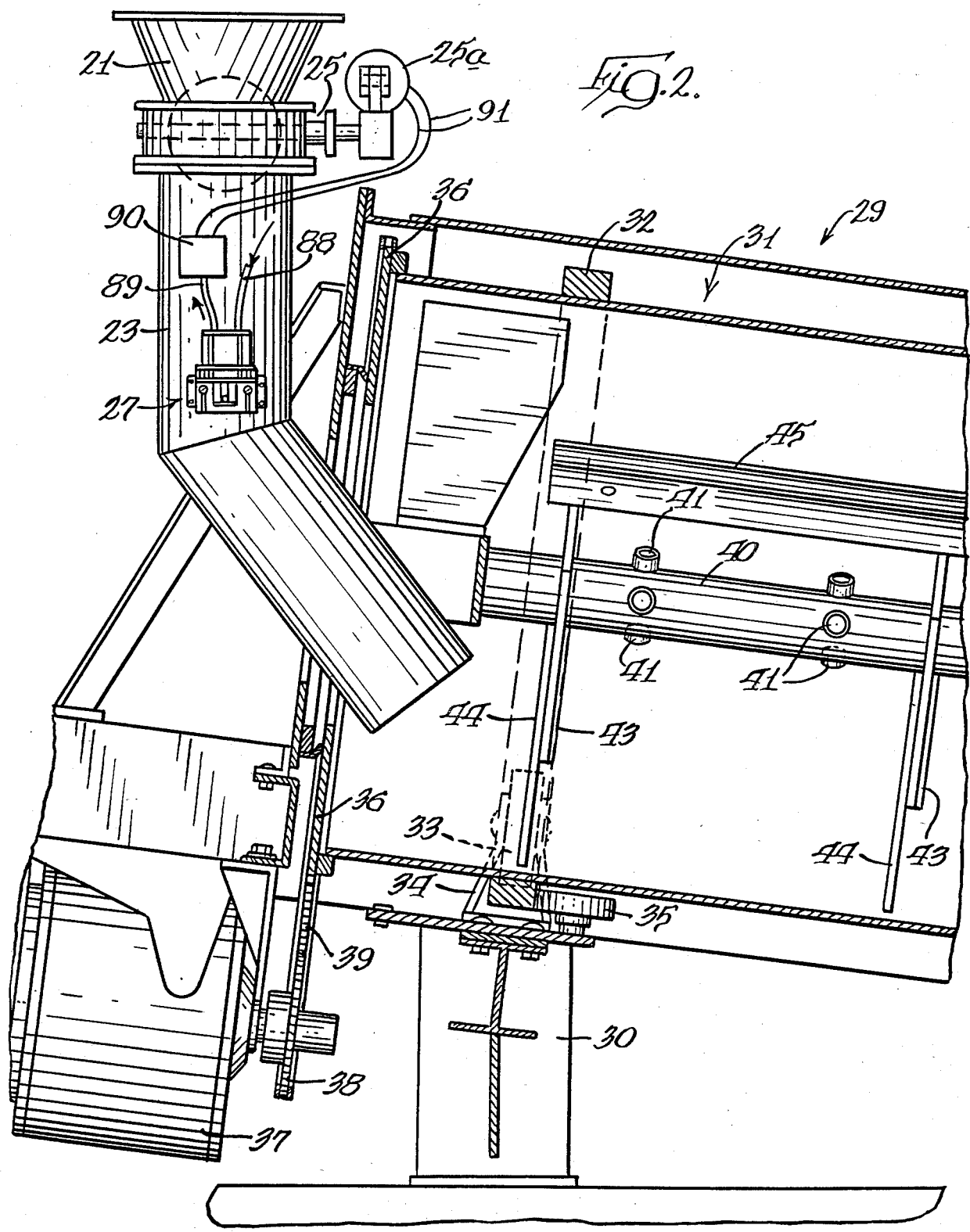
FIG. 2 is a fragmentary sectional view on an enlarged scale showing the feed conduit, the feed valve, the material flow transducer, and one end of the moistening chamber.

The valves 16, 25 and 26 may be of any of the kinds commonly used to control the flow of material in a pulverulent material handling system, and as seen in FIG. 2 the feed valve 25 is a butterfly valve.

Also, as is customary in such systems, there is an electropneumatic or electrohydraulic control for opening and closing the valves 16, either in accordance with a sensor in the transfer hopper 19, or on a timed cycle.

The controls also include conventional means for locking out control of the feed valve 25 and the feed bypass valve 26 by the respective transducers 27 and 28, so that when desired all the material may pass through the feed conduit 23 or through the feed bypass conduit 24.

The system includes a moistening chamber, indicated generally at 29, which has supports 30 that carry an axially rotatable tumbling drum, indicated generally at 31, which has circumferential drive bands 32 that are carried upon rollers such as the roller 33 seen in FIG. 2. Each of the rollers 33 is journalled in a yoke 34, and guide wheels 35 bear upon the sides of the bands 32 to retain the tumbling drum in place. At one end of the tumbling drum is a ring sprocket 36 by means of which the drum is rotated by an electric motor 37 acting through a sprocket 38 and drive chain 39.

On the axis of the tumbling drum 31 is a liquid pipe 40 that is provided with a plurality of sets of liquid sprays 41, and a lower end of the pipe 40 is connected with a source of liquid, commonly water, as through an elbow 42.

Mounted on the pipe 40 are fixed radial arms 43 that carry baffle plates 44 in the lower part of the tumbling drum and longitudinal mixing beams 45 in the upper part of the drum.

Turning now to FIGS. 3 to 5, the prototype fluent solid material flow transducers 27 and 28 are seen to consist of a frame, indicated generally at 50, which includes a threaded, hollow mounting boss 51 which screws into the feed conduit 23 or the bypass feed conduit 24. On the mounting boss 51 is a bracket 52 having two jack screws 53 which bear against the conduit to relieve the boss 51 of most of the load of the transducer. A slotted frame support plate 54 is clamped to the bracket 52 by means of bolts 55 which are mounted in the slots of the support plate 54 to permit vertical adjustment of the support plate 54 relative to the mounting bracket 52.

Integral with the support plate 54 are horizontal support arms 56 which carry a mounting base 57 that forms the bottom of a load cell, indicated generally at 58. Surmounting the base 57 is a stabilizing diaphragm 59 upon the periphery of which is seated a lower load cell frame 60 which is, in turn, surmounted by a control diaphragm 61. Resting upon the perimeter of the control diaphragm 61 is an upper load cell frame 62, and the top of the load cell is closed by a plate 63 which seats upon a sealing gasket 64. The load cell is assembled by four long threaded bolts 65 which extend through the cover plate 63 and the base 57 and receive nuts 66. The threaded lower extremities of the bolts 65 extend through holes in lower plates 67a and 67b and receive retaining nuts 68 which clamp the load cell onto the support arms 56. Thus by loosening the retaining nuts 68 the load cell may be adjusted toward and away from the conduit.

A piston sub-assembly 69 is assembled so as to be fixedly secured and sealed to the stabilizing diaphragm 59 and the control diaphragm 61. The sub-assembly comprises a headed, threaded bolt 70 which extends through close-fitting, central holes in the two diaphragms 59 and 61. Upper metal disks 71a and 71b slidably surround the upper end of the bolt 70, sandwiching the control diaphragm 61; while lower metal disks 72a and 72b sandwich the stabilizing diaphragm 59. A spacer sleeve 73 fixes the space between the disks 71b and 72a, and the disk 72b is threaded to screw onto the bolt 70 and clamp the sub-assembly parts in their relatively fixed positions with the bolt 70 providing a piston rod which carries a yoke 74 at its lower end. The base 57 and the lower load cell frame 60 provide means securing the periphery of the stabilizing diaphragm 59 to a lower part of the load cell.

Extending through the load cell top plate 63 are an air inlet pipe 75, an air outlet pipe 76, and a bleed nozzle 77 which has an inner end 77a immediately adjacent the inner surface of the control diaphragm 61, which is actually defined by the head of the piston rod 70. The diaphragm 61 and piston 69, the upper load cell frame 62 and the top plate 63 with the gasket 64 define a sealed chamber 78. The relationship between the inner end 77a of the bleed nozzle 77 and the head of the piston rod 70 is such that when no material is passing through the feed conduit 23 all the air entering the sealed chamber 78 through the inlet pipe 75 may enter the bleed nozzle 77 through an orifice defined by the space between the inner end 77a of the nozzle and the head of the piston rod 70, and bleed to atmosphere through the bleed nozzle 77.

The lower load cell frame 60 has an air vent hole 60a so that the space defined by the stabilizing diaphragm 59, the lower load cell frame 60 and the control diaphragm 61 is open to the atmosphere.

A sensor member, indicated generally at 79, is mounted in the hollow mounting boss 51 in a sealed, effectively friction free pivot, indicated generally at 80. The pivot consists of an O-ring 81 and a plug of silicone adhesive 82 which surrounds the sensor member 79 between the O-ring and the inner surface of the conduit 23.

The sensor member 79 consists of a sensing arm 83 which extends into the conduit 23, and a force arm 84 which seats in the piston yoke 74. Secured to the lower plate 67a is a pair of bolts 85 which carry a spacer plate 86 and a pair of blocks 87 that closely confine the force arm 84 against lateral movement which would otherwise be possible by reason of the use of an O-ring pivot.

In operation, the impact of pulverulent material dropping through the conduit 23 or 24, as the case may be, pivots the sensor member 79 so that the force arm 84 moves the piston and control diaphragm to vary the bleed nozzle orifice and thus vary the pressure of air in the air outlet pipe 76. The total movement of the piston with the air flow rate used in the present device is no more than about 0.01 inch (0.25 mm). For such small motion there is no friction in the sealed pivot 80.

The sensing arm 83 is shown in FIG. 4 as extending about 83% of the way across the conduit 23; but this is by no means necessary because it is only the material that impacts a small part near the outer end 83a of the sensing arm that determines the position of the control diaphragm 61. This is because although material flow varies across the area of the conduit, the differences from place to place remain quite uniform, so total flow may be adequately determined by the flow in a small "sample" area in which the end portion of the sensing arm is located. Where this may be affects only the relative lengths of the sensing arm 83 and the force arm 84; and this can be compensated for by moving the load cell 58a in or out on the support arms 56.

Referring now to FIG. 2, the air inlet pipe 75 is connected by a tube 88 to a constant flow rate air source, while the air outlet pipe 76 is connected by a tube 89 to a commercially available device 90 for converting varying air pressures to electrical signals which act through control wires 91 to operate the power unit 25a for the feed valve 25 (or the power unit 26a for the bypass feed valve 26) and thus change the position of the butterfly valve 25 (or 26) as required to control the flow of material passing through the feed conduit 23 (or the bypass conduit 24). A suitable air flow rate in the tube 88 is 2 SCFH (0.0566.5 m$^3$h).

The control box 90 may contain any of several different types of commercially available devices including, for example, a deadband three-point switch, an analog controller or an electronic transducer. The preferred device is a deadband three point switch sold by Dwyer Instruments, Inc. of Michigan City, Ind., as its PHOTOHELIC® SWITCH/GAGE Model 3050-RMR, which has a built-in air pressure gauge.

In a prototype of the system, the flow transducer 27, or 28, holds the flow rate of fly ash passing through the feed conduit 23, or the bypass feed conduit 24, within ±5% of a desired rate. This is a narrow enough variation to provide quite uniform moisture content of material fed out of the moistening chamber 29 through a discharge conduit 92, or to provide flow of dry material through a discharge conduit 93 which is sufficiently uniform to avoid overloading of a transport device such as a truck, in spite of the fact that there is about a three second lag between movement of the feed valve and the actual change of the rate of ash flow.

A desired rate of material flow may be selected, and the load cell 58 may be adjusted in or out on the support arms 56 to change the effective length of the force arm 84. The adjustment permits the transducer to be used over a very wide range of fluid pressure—i.e., from as little as 1 inch H$_2$O up to several p.s.i. The load cell is adjusted so as to put the presure gauge pointer at a preselected set point.

The foregoing detailed description is given for clearness of understanding only, and no unnecessary limitations should be understood therefrom, as modifications will be obvious to those skilled in the art.

I claim:

1. In a system for handling fluent solid material which includes a transfer hopper, duct means for delivering material to said transfer hopper, means for controlling the flow of material through said duct means, and an upright feed conduit the upper end of which communicates with the bottom of the transfer hopper to receive material from said hopper for unobstructed gravity flow, the improvement comprising, in combination:

a feed valve to control movement of material into the upper end of the feed conduit;
   a material flow transducer which includes a sensor in the feed conduit to continuously sense the volume of material flowing through the conduit;
   means operatively associated with the transducer and with the feed valve to control the position of the valve in response to the sensed volume of material flowing through the feed conduit so as to closely control the rate at which material flows from said conduit;
   a moistening chamber in direct communication with the bottom of the feed conduit;
   means for introducing liquid into the moistening chamber at a controlled rate;
   means for moving moistened material from the moistening chamber to a transport device;
   a feed bypass conduit that also communicates with the bottom of the transfer hopper to feed material directly into a transport device;
   a feed valve in the upper end of said feed bypass conduit;
   a material flow transducer which includes a sensor in the feed bypass conduit;
   and means for selectively closing the feed valve in one or the other of said conduits.

2. In a system for handling fluent solid material which includes a material collecting hopper having a bottom provided with several discharge openings each of which communicates with a discharge duct, a transfer hopper which receives material from all of said discharge ducts, said transfer hopper having a bottom outlet, a moistening chamber, means for introducing liquid into the moistening chamber at a controlled rate, transfer means for moving material from said transfer hopper into said moistening chamber to be mixed with said liquid to improve its handling characteristics, and means for moving moistened material from the moistening chamber, the improvement comprising, in combination:

the transfer means includes an upright feed conduit through which material drops freely and unobstructedly by gravity, said feed conduit having an upper end connected to the bottom outlet of the transfer hopper and a lower end connected to the moistening chamber;
   a feed valve to control movement of material into the upper end of the feed conduit;
   a material flow transducer which includes a sensor in the feed conduit to continuously sense the volume of material flowing through the conduit;
   means operatively associated with the transducer and with the feed valve to control the position of the valve in response to the sensed volume of material flowing through the feed conduit so as to closely control the ratio of solid material to liquid in the moistening chamber;
   a second bottom outlet from the transfer hopper;
   a feed bypass conduit having an upper end that communicates with said second bottom outlet;
   a feed bypass valve to control movement of material into the upper end of said feed bypass conduit;
   a material flow transducer which includes a sensor in the bypass conduit;
   and means for selectively closing the feed valve or the feed bypass valve so that material may either enter the moistening chamber or bypass said moistening chamber.

* * * * *